(12) United States Patent
Dong

(10) Patent No.: US 9,231,864 B2
(45) Date of Patent: Jan. 5, 2016

(54) TECHNIQUES FOR PACKET MANAGEMENT IN AN INPUT/OUTPUT VIRTUALIZATION SYSTEM

(75) Inventor: Yao Z Dong, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 192 days.

(21) Appl. No.: 13/976,428

(22) PCT Filed: Mar. 19, 2012

(86) PCT No.: PCT/CN2012/072532
§ 371 (c)(1),
(2), (4) Date: Jun. 26, 2013

(87) PCT Pub. No.: WO2013/138977
PCT Pub. Date: Sep. 26, 2013

(65) Prior Publication Data
US 2014/0233568 A1    Aug. 21, 2014

(51) Int. Cl.
| | |
|---|---|
| *H04L 12/54* | (2013.01) |
| *H04L 12/56* | (2006.01) |
| *G06F 13/00* | (2006.01) |
| *H04L 12/713* | (2013.01) |
| *H04L 12/741* | (2013.01) |

(52) U.S. Cl.
CPC .............. *H04L 45/741* (2013.01); *G06F 13/00* (2013.01); *H04L 45/586* (2013.01); *H04L 45/745* (2013.01)

(58) Field of Classification Search
CPC ..... H04L 45/74; H04L 45/741; H04L 45/745; H04L 45/586; G06F 13/00
See application file for complete search history.

(56) References Cited

U.S. PATENT DOCUMENTS

| | | | |
|---|---|---|---|
| 8,089,964 B2 * | 1/2012 | Lo ............................ | H04L 12/18 370/231 |
| 8,958,298 B2 * | 2/2015 | Zhang et al. ................... | 370/235 |
| 2004/0047320 A1 * | 3/2004 | Eglin ............................. | 370/338 |
| 2004/0085972 A1 * | 5/2004 | Warren ................. | H04L 12/433 370/401 |
| 2006/0114903 A1 * | 6/2006 | Duffy et al. .................... | 370/390 |
| 2006/0195674 A1 | 8/2006 | Arndt et al. | |

(Continued)

FOREIGN PATENT DOCUMENTS

| | | |
|---|---|---|
| CN | 1490991 A | 4/2004 |
| CN | 1981268 A | 6/2007 |
| CN | 101098285 A | 1/2008 |

OTHER PUBLICATIONS

International Search Report and Written Opinion, Mailed Date: Dec. 20, 2012, Application No. PCT/CN2012/072532, Filed Date: Mar. 19, 2012, pp. 11.

*Primary Examiner* — Kevin Mew
(74) *Attorney, Agent, or Firm* — Kacvinsky Daisak Bluni PLLC

(57) ABSTRACT

Techniques for managing packets in an input/output virtualization (IOV) capable computing environment are described herein. One aspect comprises receiving, at one or more transceivers comprising an input/output capable adapter, a packet addressed to an input/output virtualization capable adapter destination, and forwarding the packet to a virtual router; applying, by a processor circuit coupled to the one or more transceivers, one or more packet management policies to the packet via the virtual router; routing the packet via the virtual router to the input/output virtualization capable adapter destination; and transmitting the packet to the input/output virtualization capable adapter destination via an input/output virtualization capable adapter architecture. Other embodiments are described and claimed.

28 Claims, 10 Drawing Sheets

(56) References Cited

U.S. PATENT DOCUMENTS

| | | | |
|---|---|---|---|
| 2006/0242354 A1* | 10/2006 | Johnsen et al. | 710/316 |
| 2006/0253619 A1* | 11/2006 | Torudbakken et al. | 710/31 |
| 2007/0183393 A1* | 8/2007 | Boyd | H04L 45/60 370/351 |
| 2008/0137676 A1 | 6/2008 | Boyd et al. | |
| 2013/0121209 A1* | 5/2013 | Padmanabhan et al. | 370/255 |
| 2014/0237156 A1* | 8/2014 | Regula | G06F 21/85 710/314 |
| 2014/0269692 A1* | 9/2014 | Flynn | H04L 45/566 370/389 |

\* cited by examiner

800

DETERMINE A DESTINATION ADDRESS OF A PACKET RECEIVED AT A VIRTUAL ROUTER
802

MODIFY THE ADDRESS OF THE PACKET TO CORRESPOND WITH THE ADDRESS OF THE DESTINATION WITHIN THE INPUT/OUTPUT VIRTUALIZATION CAPABLE ADAPTER
804

FORWARD THE PACKET TO THE INPUT/OUTPUT VIRTUALIZATION CAPABLE ADAPTER ARCHITECTURE FOR TRANSMISSION TO THE DESTINATION
806

DETERMINE A DESTINATION ADDRESS OF A PACKET
RECEIVED AT A VIRTUAL ROUTER
902

PERFORM A LOOKUP OF THE ADDRESSES ASSOCIATED
WITH THE PACKET IN AN ADDRESS REGISTRATION
904

PREVENT TRANSMISSION OF A PACKET HAVING AN
ADDRESS THAT IS NOT LOCATED IN THE ADDRESS
REGISTRATION
906

*FIG. 9*

TECHNIQUES FOR PACKET MANAGEMENT IN AN INPUT/OUTPUT VIRTUALIZATION SYSTEM

BACKGROUND

A virtual machine (VM) may comprise a software implementation of a machine (e.g., a computer) that is operative to execute programs like a physical machine. Virtualized computing elements include operating systems, applications, processors, and memory elements. Virtualization poses new challenges for input/output, commonly referred to as I/O, performance for physical computing devices. Input/output performance is critical to high performance computer systems, such as those found in modern data centers and cloud computing infrastructure. In response, input/output virtualization methods, commonly referred to as IOV, have been developed that provide hardware and software configurations that abstract underlying hardware interfaces utilized in communication technologies. In this manner, input/output devices may be virtualized and shared amongst multiple virtual machines.

Input/output virtualization techniques suffer from high overhead because of operational demands placed on key components, such as the virtual machine monitor (VMM or hypervisor), which manages key host resources and virtual machine functions. Operational demands include packet copying and interrupt handling. Single root input/output virtualization, commonly referred to as SR-IOV, capable devices provide a set of peripheral component interconnect (PCI) express (PCIe) functions designed to limit virtual machine monitor intervention in input/output virtualization systems, resulting in increased input/output performance. However, the performance increase has come at the cost of decreased control and manageability of input/output virtualization systems. Therefore, one design goal for input/output virtualization systems is to provide increased input/output performance without negatively effecting system manageability. Consequently, techniques designed to provide security, control, and manageability in high performance input/output virtualization systems are desirable.

BRIEF DESCRIPTION OF THE DRAWINGS

FIG. 8 illustrates an embodiment of a second logic flow for an input/output virtualization packet management system.

FIG. 9 illustrates an embodiment of a third logic flow for an input/output virtualization packet management system.

DETAILED DESCRIPTION

Figure 1:
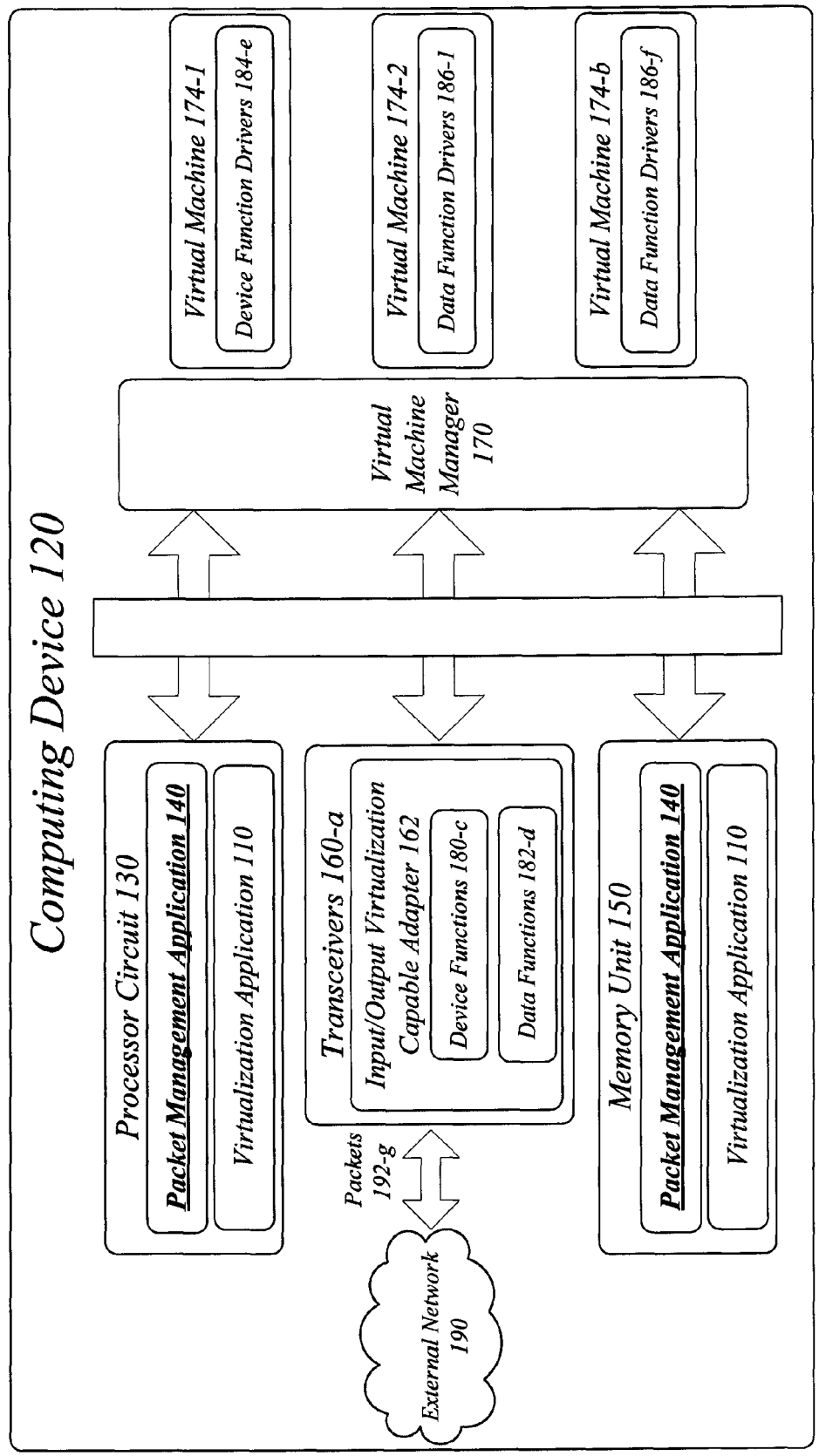
FIG. 1 illustrates an embodiment of an input/output virtualization packet management system.

Various embodiments are generally directed to virtualized systems supporting multiple virtual machines. Certain embodiments are particularly directed to packet management techniques for virtualized systems supporting input/output virtualization, commonly referred to as IOV.

Virtualized systems are facing increased input/output demands from modern data centers and cloud usage models. Input/output virtualization, also commonly referred to as network virtualization, has become a necessary component of virtualized systems. Although input/output virtualization provides many advantages, it may also negatively affect I/O performance in virtualized environments. In input/output virtualization, the physical network interfaces of a virtual system machine are shared among multiple virtual machines (VMs) running on the virtual system. Initial input/output virtualization implementations involved software emulation of certain input/output functions, but suffered significant performance penalties due to virtual machine monitor (VMM) intervention for memory protection, packet copying, and address translation operations. Exemplary virtual machine monitor implementations include Kernel Virtual Machine (KVM)® and its Virtio network interface driver, and the Xen® virtual machine monitor and its paravirtualized network interface driver.

Single root input/output virtualization, commonly referred to as SR-IOV, has been proposed by the Peripheral Component Interconnect Special Interest Group (PCI-SIG) Single Root input/output Virtualization and Sharing 1.1 Specification (PCI SR-IOV) to provide a set of hardware and software enhancements for virtual system peripheral component connect (PCI) express (PCIe) physical network interfaces. These enhancements are aimed at providing input/output virtualization through a PCIe network interface card (NIC) without requiring major virtual machine monitor intervention, for example, by allowing direct virtual machine access to the PCIe NIC (e.g, through direct memory access (DMA) processes). As such, single root input/output virtualization has demonstrated improved input/output performance and scalability in virtual systems. However, the performance improvements have come at the cost of network traffic management capabilities, such as packet filtering, which is critical in data centers and cloud computing environments.

Embodiments solve these and other problems by implementing software routing techniques with an input/output virtualization capable device. For example, embodiments may implement software routing techniques within a single root input/output virtualization capable device. More particularly, the software routing techniques are arranged to receive network packets (e.g., Ethernet packets) addressed to an input/output virtualization capable device, deliver the packets to a software router configured to manage the packets according to one or more packet management policies, and to route the managed packets to their destination component via the internal input/output virtualization device architecture. Embodiments further provide software routing techniques for managing and transmitting packets from an input/output virtualization capable device to a remote device, for example, through an external network. Providing packet management functions for input/output virtualization capable devices results in increased control, manageability, and security within a virtual computing environment, and potentially enables data centers and cloud computing environments to be more dynamic, secure, reliable, and cost efficient.

In one embodiment, for example, an apparatus may comprise one or more transceivers, wherein one of the one or more transceivers may be configured as an input/output virtualization capable adapter. A processor circuit may be coupled to the one or more transceivers and a memory unit may be coupled to the processor circuit. The memory unit may be configured to store a packet management application operative on the processor circuit to apply packet management policies and to route packets transmitted to and from the input/output virtualization capable adapter. The packet management application may provide a proxy interface upstream component operative to receive and forward a packet addressed to an input/output virtualization capable adapter destination; a virtual router component operative to receive the packet as forwarded by the proxy interface upstream component, the virtual router component to apply one or more packet management policies to the packet and to route the packet to the input/output virtualization capable adapter destination; and a proxy interface downstream component operative to receive the packet as routed by the virtual router and to transmit the packet to the input/output virtualization capable adapter destination via an input/output virtualization capable adapter architecture. In this manner, packets transmitted to and from an input/output virtualization capable adapter, such as a single root input/output virtualization capable adapter, may be managed according to certain packet management policies to provide a virtual computing environment comprising a more secure and manageable input/output virtualization environment. As a result, the embodiments can improve security, manageability, scalability, or modularity for computing environments utilizing virtual machines having packet managed input/output virtualization as described herein.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an input/output virtualization packet management system 100. In one embodiment, the input/output virtualization packet management system 100 may comprise a computing device 120 having a processor circuit 130 and a memory unit 150. The computing device 120 may further have installed software applications including a virtualization application 110 and a packet management application 140. Although the input/output virtualization packet management system 100 shown in FIG. 1 has a limited number of elements in a certain topology, it may be appreciated that the input/output virtualization packet management system 100 may include more or less elements in alternate topologies as desired for a given implementation.

In various embodiments, the input/output virtualization packet management system 100 may comprise a computing device 120. Examples of a computing device 120 may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

In various embodiments, the input/output virtualization packet management system 100 may comprise a processor circuit 130. In general, the processor circuit 130 may have processor architecture suitable for sequential processing operations. In one embodiment, for example, the processor circuit 130 may comprise a general purpose processor circuit used for general purpose computing, such as a central processing (CPU) for a computing platform. A CPU is designed for applications that are latency-sensitive and have implicit instruction-level parallelism. A CPU may have a largely sequential structure, and as such, a CPU is particularly well-suited for sequential computing operations. The processor circuit 130 can be any of various commercially available general purpose processors, including without limitation an AMD® Athlon®, Duron® and Opteron® processors; ARM® application, embedded and secure processors; IBM® and Motorola DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processor circuit 130. The embodiments are not limited in this context.

In various embodiments, the input/output virtualization packet management system 100 may comprise a memory unit 150. The memory unit 150 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. The embodiments are not limited in this context.

In the illustrated embodiment shown in FIG. 1, the processor circuit 130 may be arranged to execute a virtualization application 110 and a packet management application 140. The virtualization application 110 is generally arranged to install and manage multiple virtual machines 174-b on the computing device 120. In general, a virtual machine (VM) 174-b is an abstract computer architecture that can be implemented in hardware or software. Either implementation is intended to be included in the following descriptions of a virtual machine 174-b. In one embodiment, for example, a virtual machine 174-b is a software implementation of a machine that executes programs like a physical machine, such as the computing device 120. The virtualization application 110 may implement a virtual machine 174-b as a system virtual machine that provides a complete system platform capable of supporting execution of a complete operating system (OS) and/or application programs. Additionally or alternatively, the virtualization application 110 may implement a virtual machine 174-b as a process virtual machine designed to run a single program, which means that it supports a single process. The virtual machines 174-b may use various hardware resources provided by the computing device 120, such as the processor circuit 130 and the memory unit 150, among other computing and communications platform components implemented by the computing device 120. The virtualization application 110 may implement any number of virtualization techniques to create the virtual machines 174-b, including a virtual machine monitor (VMM) 172 or a hypervisor and a service virtual machine 174, among other virtualization techniques. The embodiments are not limited in this context.

The virtualization application 110 may be implemented using any number of known virtualization software and/or hardware platforms. Examples for the virtualization application 110 may include without limitation virtualization applications such as Kernel-based Virtual Machine (KVM)® made by Red Hat®, Inc., Oracle® VMS made by Oracle Corporation, VMware® ESX® made by VMware, Inc., and VxWorks® made be Wind River Systems®, Inc., z/VM® made by International Business Machines® Corporation, and Xen® made by Citrix Systems, Inc., and similar virtualization platforms. The embodiments are not limited in this context.

Although various embodiments are described in the context of virtual machines 174-b as created and managed by the virtualization application 110, it may be appreciated that some embodiments may be implemented for any computing device 120 providing a hardware platform that is segmented into multiple, discrete, computing portions. For instance, various embodiments may be implemented using system partitions that separate a single hardware platform into multiple hardware sub-systems. For instance, a hardware platform having multiple processors and memory units may be partitioned into two hardware sub-systems, each having a processor and a memory unit. The embodiments are not limited in this context.

It is worthy to note that "a" and "b" and "c" and similar designators as used herein are intended to be variables representing any positive integer. Thus, for example, if an implementation sets a value for b=5, then a complete set of virtual machines 174-b may include virtual machines 176-1, 176-2, 176-3, 176-4, and 176-5. The embodiments are not limited in this context.

In various embodiments, the computing device 120 may comprise one or more transceivers 160-a. Each of the transceivers 160-a may be implemented as wired transceivers, wireless transceivers, or a combination of both. In some embodiments, the transceivers 160-a may be implemented as physical wireless adapters or virtual wireless adapters, sometimes referred to as "hardware radios" and "software radios." In the latter case, a single physical wireless adapter may be virtualized using software into multiple virtual wireless adapters. A physical wireless adapter typically connects to a hardware-based wireless access point. A virtual wireless adapter typically connects to a software-based wireless access point, sometimes referred to as a "SoftAP." For instance, a virtual wireless adapter may allow ad hoc communications between peer devices, such as a smart phone and a desktop computer or notebook computer. Various embodiments may use a single physical wireless adapter implemented as multiple virtual wireless adapters, multiple physical wireless adapters, multiple physical wireless adapters each implemented as multiple virtual wireless adapters, or some combination thereof. The embodiments are not limited in this case.

The wireless transceivers 160-a may comprise or implement various communication techniques to allow the computing device 120 to communicate with other electronic devices. For instance, the wireless transceivers 160-a may implement various types of standard communication elements designed to be interoperable with a network, such as one or more communications interfaces, network interfaces, NICs, radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

In various embodiments, the computing device 120 may implement different types of transceivers 160-*a*. Each of the transceivers 160-*a* may implement or utilize a same or different set of communication parameters to communicate information between various electronic devices. In one embodiment, for example, each of the transceivers 160-*a* may implement or utilize a different set of communication parameters to communicate information between the computing device 120 and one or more remote devices. Some examples of communication parameters may include without limitation a communication protocol, a communication standard, a radio-frequency (RF) band, a radio, a transmitter/receiver (transceiver), a radio processor, a baseband processor, a network scanning threshold parameter, a radio-frequency channel parameter, an access point parameter, a rate selection parameter, a frame size parameter, an aggregation size parameter, a packet retry limit parameter, a protocol parameter, a radio parameter, modulation and coding scheme (MCS), acknowledgement parameter, media access control (MAC) layer parameter, physical (PHY) layer parameter, and any other communication parameters affecting operations for the transceivers 160-*a*. The embodiments are not limited in this context.

In one embodiment, for example, the transceiver 160-*a* may comprise a radio designed to communicate information over a wireless local area network (WLAN), a wireless metropolitan area network (WMAN), a wireless wide area network (WWAN), or a cellular radiotelephone system. The transceiver 160-*a* may be arranged to provide data communications functionality in accordance with different types of longer range wireless network systems or protocols. Examples of suitable wireless network systems offering longer range data communication services may include the IEEE 802.xx series of protocols, such as the IEEE 802.11a/b/g/n series of standard protocols and variants, the IEEE 802.16 series of standard protocols and variants, the IEEE 802.20 series of standard protocols and variants (also referred to as "Mobile Broadband Wireless Access"), and so forth. Alternatively, the transceiver 160-*a* may comprise a radio designed to communication information across data networking links provided by one or more cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and similar systems. It may be appreciated that other wireless techniques may be implemented, and the embodiments are not limited in this context.

According to an embodiment, the transceivers 160-*a* may be comprised of an input/output virtualization capable adapter 162 configured to virtualize the input/output path between a computing device 120 and one or more remote computing devices. Input/output virtualization allows a single input/output resource to be shared among multiple virtual machines 174-*b*. Examples of virtualized input/output resource include an Ethernet NIC, a disk controller (e.g., RAID controllers), a fiber channel host bus adapter (HBA), or graphics and video cards and co-processors. Approaches for input/output virtualization include models wherein virtualization is accomplished through software, hardware, or some combination thereof. Input/output virtualization techniques operate to provide emulated instances of input/output resources to virtual machines 174-*b* operating within a virtualized computing environment. In one embodiment, the input/output virtualization capable adapter 162 is implemented as a single root input/output virtualization capable NIC, as discussed more fully below.

The input/output virtualization capable adapter 162 may be configured to implement functions as device functions 180-*c* and data functions 182-*d*. Device functions 180-*c* may be comprised of full input/output virtualization capable adapter functions that support management of the input/output virtualization capable adapter 162, for example, physical ports of the adapter. Data functions 182-*d* are "light-weight" instances of adapter functions and are generally limited to processing input/output streams, basically involving data movement functions. For instance, in a single root input/output virtualization capable device, device functions 180-*c* may be implemented as physical functions, while data functions 182-*d* may be implemented as virtual functions, as the terms are known by a person having ordinary skill in the art. Device functions 180-*c* and data functions 182-*d* are associated with virtual machines 174-*b* through device function drivers 184-*e* and data function drivers 186-*f* respectively. There may be multiple data functions 182-*d* per each physical function 180-*c*.

Although not shown, the computing device 120 may further comprise one or more device resources commonly implemented for electronic devices, such as various computing and communications platform hardware and software components typically implemented by a personal electronic device. Some examples of device resources may include without limitation a co-processor, a graphics processing unit (GPU), a chipset/platform control hub (PCH), an input/output (input/output) device, computer-readable media, display electronics, display backlight, network interfaces, location devices (e.g., a GPS receiver), sensors (e.g., biometric, thermal, environmental, proximity, accelerometers, barometric, pressure, etc.), portable power supplies (e.g., a battery), application programs, system programs, and so forth. Other examples of device resources are described with reference to exemplary computing architectures shown by FIG. 10. The embodiments, however, are not limited to these examples.

The packet management application 140 is generally arranged to manage packets 192-*g* being transmitted to and from an input/output virtualization capable adapter 162. In one embodiment, a packet 192-*g* is transmitted from an external network 190 to an input/output virtualization capable adapter 162 accessible by the computing device 120. Packets 192-*g* may be comprised of one or more addresses, such as media access control (MAC), Internet protocol (IP), and transmission control protocol (TCP) addresses, and data (i.e., the "payload"). In addition, packets 192-*g* may be configured according to any communication protocol capable of operating according to embodiments disclosed herein, including the IPv4 and IPv6 versions of the Internet protocol (IP) as described in Internet Engineering Task Force (IETF) Internet standard documents RFC 791 and 2460, respectively. The packet management application 140 may receive the packet 192-*g*, for example, because the packet management application 140 or some component thereof is associated with a destination address (e.g., the MAC address) in a packet 192-*g* header. The packet management application 140 may apply one or more packet management policies to the packet 192-*g*, such as address filtering policies, and route the packet 192-*g* for delivery to the target destination within the computing device 120. In another embodiment, the packet management application 140 is configured to receive a packet 192-*g* from the input/output virtualization capable adapter 162, and to manage and transmit the packet 192-g to a remote device, for example, a remote device accessible through the external network 190.

Particular aspects, embodiments and alternatives of the input/output virtualization packet management system 100 and the packet management application 140 may be further described with reference to FIGS. 2-6.

Figure 2:
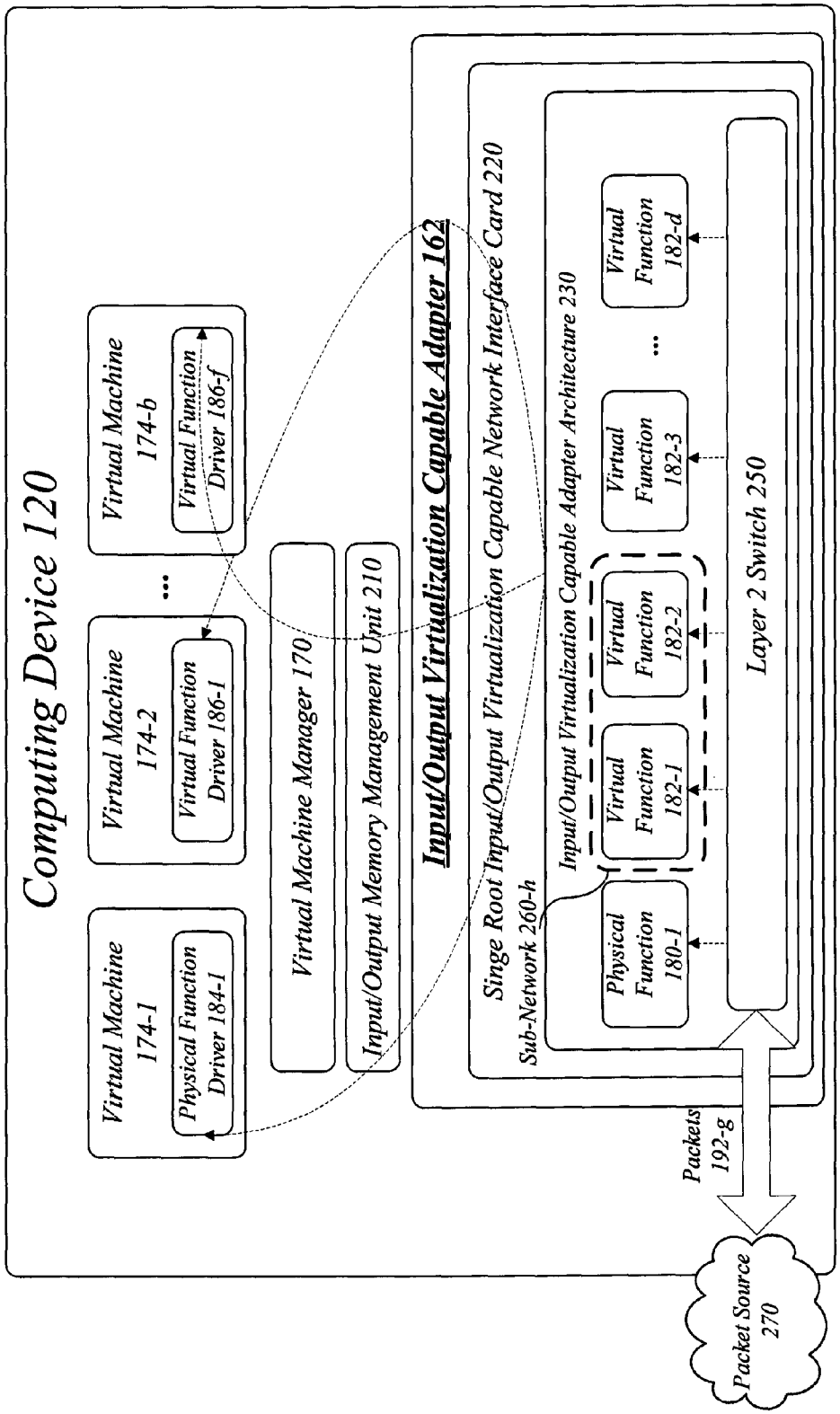
FIG. 2 illustrates an embodiment of an input/output virtualization capable adapter operable within an input/output virtualization packet management system.

FIG. 2 illustrates a block diagram for an input/output virtualization capable adapter 162. The input/output virtualization capable adapter 162 may be an exemplary implementation of the input/output virtualization capable adapter 162. In particular, the input/output virtualization capable adapter 162 depicted in FIG. 2 may comprise a single root input/output virtualization capable adapter. The input/output virtualization capable adapter 162 shown in FIG. 2 has a limited number of elements in a certain topology; however, it may be appreciated that the input/output virtualization capable adapter 162 may include more or less elements in alternate topologies as desired for a given implementation. Although the example block diagram of FIG. 2 illustrates a single root input/output virtualization capable adapter, embodiments are not so limited, as any input/output virtualization capable adapter having the ability to operate according to embodiments is contemplated herein. Exemplary adapters include, but are not limited to, multi-root input/output virtualization (MR-IOV) capable adapters and multiple queue pair capable devices (e.g., devices having a layer 2 filtering component and wherein each queue pair has a MAC address), such as devices comprising VMDq technology, made by the Intel Corporation, and vNIC® technology, made by Solarflare Communications, Inc. Layer 2 and layer 3 as discussed herein refer to layer 2 and layer 3 information of the Open Systems Interconnection (OSI) model provided in the International Standards Organization ISO/IEC 7498, which defines a 7-layer model for network communication between interconnected systems, and as generally known by a person having ordinary skill in the art.

The input/output virtualization capable adapter 162 comprises a single root input/output virtualization capable network interface card 220 accessible by the computing device 120. The single root input/output virtualization capable network card 220 supports an input/output virtualization capable adapter architecture 230 including a layer 2 switch 250, device functions 180-c (i.e. physical function 180-1), and data functions 182-d (i.e., virtual functions 182-1, 182-2, 182-3, 182-d). An input/output memory management unit 210, commonly referred to as IOMMU, may be associated with the single root input/output virtualization capable network interface card 220. In general, the input/output memory management unit 210 allows the virtual machines 174-1, 174-2, 174-3, 174-b, and components thereof, to directly access the single root input/output virtualization capable network interface card 220 without or with reduced virtual machine monitor 170 intervention, improving the performance of data movement within the computing device 120. As shown in FIG. 2, embodiments provide that components of the input/output virtualization capable adapter 162 may be arranged in one or more sub-networks. For instance, the virtual functions 182-d may be arranged (e.g., through subnetting) into one or more sub-networks 260-h, as shown for virtual functions 182-1 and 182-2.

The input/output virtualization capable adapter architecture 230 is configured to sort and deliver packets 192-g within the computing device 120. The layer 2 switch 250 is configured to receive packets 192-g from a packet source 270 and to sort packets 192-g based on layer 2 information. For example, in one embodiment, the layer 2 switch 250 is configured to sort packets 192-g based on a MAC address contained within a header of the packet 192-g. In a conventional single root input/output virtualization capable system, the packet source 270 may be an external network 190 accessible by the single root input/output virtualization network interface card 220, for example, through a physical port. However, according to embodiments provided herein, the packet source 270 may be the packet management application 140.

The input/output virtualization capable adapter architecture 230 may be comprised of device functions 180-c in the form of a physical function 180-1 and multiple data functions 182-d in the form of virtual functions 182-1, 182-d. The layer 2 switch 250 may deliver sorted packets 192-g to the virtual function 182-d, for example, via a receive queue configured for the destination virtual function 182-d, designated by the MAC address contained within the packet 192-g. The packet 192-g may be delivered to the destination virtual machine 174-b operating in the electronic device 120 through the corresponding virtual function driver 182-g, for example, utilizing direct memory access (DMA) processes. As shown in FIG. 2, the input/output virtualization capable adapter architecture 230 supports the sorting and delivery of packets 192-g received at the single root input/output virtualization capable network interface card 220 from a packet source 270 to their intended destination (e.g., a virtual machine 174-b). Although the input/output virtualization capable adapter 162 illustrated in FIG. 2 is discussed in terms of managing and delivering a packet 192-g received at the input/output virtualization capable adapter 162, those having ordinary skill in the art will appreciate the applicability of the input/output virtualization capable adapter 162 and associated components for transmitting a packet 192-g from the input/output virtualization capable adapter 162 to an external network 190.

Figure 3:
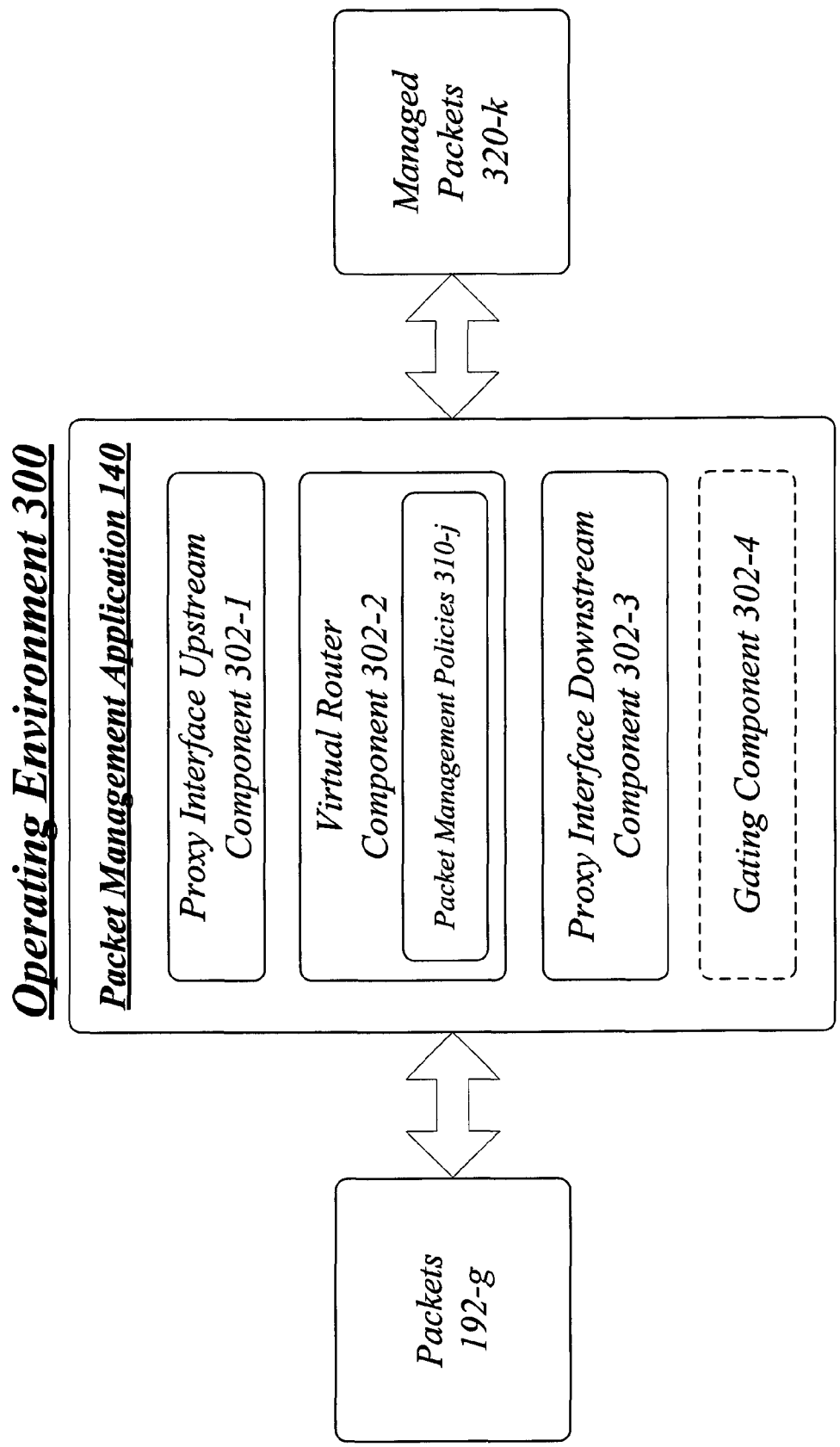
FIG. 3 illustrates an embodiment of a first operating environment for an input/output virtualization packet management system.

FIG. 3 illustrates an embodiment of an operating environment 300 for the input/output virtualization packet management system 100. More particularly, the operating environment 300 may illustrate a more detailed block diagram for the packet management application 140.

As shown in FIG. 3, the content personalization application 140 may comprise various components 302-i. As used in this application, the term "component" is intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over communications media or physical or virtual communications paths. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, bus interfaces, and PCI interfaces, including PCIe interfaces implemented through physical or virtual connections.

In the illustrated embodiment shown in FIG. 3, the content personalization application 140 may comprise a proxy interface upstream component 302-1, a virtual router component 302-2, a proxy interface downstream component 302-3, and a gating component 302-4. In this particular implementation, the gating component 302-4 is not used, and is either omitted or rendered inactive on the processor circuit 130 as indicated by the dashed border. However, the gating component 302-4 may be used in an embodiment described with reference to FIG. 6. Although the packet management application 140 shown in FIG. 3 has only four components in a certain topology, it may be appreciated that the packet management application 140 may include more or less components in alternate topologies as desired for a given implementation. The embodiments are not limited in this context.

The proxy interface upstream component 302-1 may generally receive packets 192-g transmitted to the input/output virtualization capable adapter 162. According to embodiments, the proxy interface upstream component 302-1 may be configured as one or more virtual functions 182-d or as one or more transceivers 160-a, such as one or more network interface cards, operating as one or more instances of the proxy interface upstream component 302-1. The proxy interface upstream component 302-1 may be associated with particular network address information, such as an IP, TCP, and MAC address. For instance, the proxy interface upstream component 302-1 may be associated with a MAC address visible outside of the computing device 120, which is used to address packets being transmitted to the computing device 120, including a particular virtual machine 174-b.

Electronic device 120 elements, such as transceivers 160-a, virtual machines 174-b, device function drivers 184-e, data function drivers 186-f, and the proxy interface upstream component 142 may be associated with one or more addresses used for internal and external network communication. For example, a virtual machine 174-b may be associated with a MAC address, TCP address, IP address, or some combination thereof, which may be configured by a driver 184-e, 186-f operating therein. According to embodiments, certain addresses may only be utilized within the electronic device 120, while others may utilized to address packets 192-g transmitted to the electronic device 120 from, for example, an external network 190. For example, a packet 192-g may be comprised of an Ethernet packet specifying a destination IP address and a destination MAC address. The destination MAC address may be a MAC address assigned to the proxy interface upstream component 142, while the destination IP address may be associated with one of the virtual machines 174-b.

The proxy interface upstream component 302-1 operates to forward packets 192-g to the virtual router component 302-2. The sequence of receiving a packet 192-g and forwarding the packet to the virtual router component 302-2 operates when a packet 192-g is transmitted to the computing device, for example, addressed to the input/output virtualization capable adapter 162. In the alternative, computing device 120 network interfaces (e.g., virtual machines 174-b and components thereof) may operate to transmit data and packets 192-g to remote devices located, for example, in an external network 190 through the input/output virtualization capable adapter 162. In this case, the sequence works in reverse, wherein the proxy interface upstream component 302-1 receives a packet 192-g from the virtual router component 302-2 and operates to transmit the packet 192-g to its target destination.

The virtual router component 302-2 may generally apply packet management policies 310-j to packets 192-g received therein and route packets 192-g for delivery to their intended destination. According to embodiments, the packet management policies 310-j may involve packet filtering policies, including IP and MAC address filtering policies, as known by those having ordinary skill in the art. The virtual router component 302-2 is not limited to IP and MAC filtering policies, as any packet management policy capable of operating according to embodiments is contemplated herein. For example, the virtual router component 302-2 may be comprised of packet management policies 310-j comprised of one or more high level filtering policies, such as TCP port based filtering, wherein a specific port of a virtual function 182-d may be blocked.

As described hereinabove, certain addresses, such as MAC addresses, associated with certain computing device 120 network interfaces may only be utilized internally within the computing device 120 environment. As such, the virtual router component 302-2 operates to route packets 192-g to their target destination within the computing device 120 environment. For example, the virtual router component 302-2 may receive a packet 192-g comprised of an Ethernet packet having a MAC address associated with the proxy interface upstream component 302-1 and an IP address associated with a destination computing device 120 network interface, such as a virtual function 182-d or a physical function 180-c. The virtual router component 302-2 may operate to route the packet 192-g to the destination computing device 120 network interface. For instance, the virtual router may perform an address lookup in an address registration associated with the computing device 120 using the IP address associated with the packet 192-g to determine the MAC address of the destination computing device 120 network interface. The virtual router component 302-2 may only proceed with forwarding the packet 192-g if the IP address is associated with a MAC address of the destination computing device 120 network interface (i.e., packet filtering), for example, according to an address registration.

The virtual router component 302-2 may change the initial MAC address associated with the packet (i.e., the proxy interface upstream component 302-1 MAC address) to the MAC address associated with the destination computing device 120 network interface. The packet 192-g having been subjected to the packet management policies 310-j and re-addressed for delivery to a destination computing device 120 network interface, comprises a managed packet 320-k, which may be forwarded to the proxy interface downstream component 302-3.

When a packet 192-g is being transmitted by the input/output virtualization capable adapter 162, the sequence described for the virtual router component 302-2 operates essentially in reverse. For example, the packet 192-g may be received by the virtual router component 302-2 from the proxy interface downstream component 302-3, and may be comprised of source address information associated with the source computing device 120 network interface sending the packet 192-g. The virtual router component 302-2 may operate to manage the packet 192-g (e.g., filter the packet 192-g) and determine whether or not to forward the packet to the proxy interface upstream component 302-1 (e.g., the MAC address and IP address associated with the packet 192-g are verified). If the virtual router forwards the packet 192-g to the proxy interface upstream component 302-1, it may operate to re-address the packet to be comprised of one or more address elements (e.g., destination MAC and/or IP addresses) associated with the external network target destination.

The proxy interface downstream component 302-3 generally operates to receive managed packets 320-k from the virtual router component 302-2 and to transmit the managed packets 320-k to the input/output virtualization capable adapter architecture 230 for delivery to the destination computing device 120 network interface. For instance, the proxy interface downstream component 302-3 may receive a managed packet 320-*k* and transmit the managed packet 320-*k* to the layer 2 switch 250 of the input/output virtualization capable adapter architecture 230, which may operate to deliver the managed packet 320-*k* to its ultimate destination. The input/output virtualization capable adapter architecture 230 delivers the packet 320-*k* to the destination (e.g., a virtual function 182-*d*) according to processes known to those having ordinary skill in the art. In the alternative, when a packet 192-*g* is being transmitted from a virtual function 182-*d* of the input/output virtualization capable adapter 162 to a remote device, the proxy interface downstream component 302-3 may operate to receive the packet 192-*g* from the input/output virtualization capable adapter architecture 230 and to forward the packet 192-*g* to the virtual router component 302-2.

In one embodiment, the proxy interface downstream component 302-3 may be comprised of a virtual function 182-*d* and the remaining virtual functions 182-*d* (excluding a virtual function 182-*d* being utilized as a proxy interface upstream component 302-1) operative through the input/output virtualization capable adapter 162 may be arranged in one or more internal sub-networks 260-*h*. Accordingly, the proxy interface downstream component 302-3 may operate as a bridge to an external network 190 for the virtual functions 182-*d* arranged in the one or more sub-networks 260-*h*. In another embodiment, each sub-network 260-*h* may be comprised of at least one proxy interface downstream component 302-3 such that all packets 192-*g* transmitted inside of a sub-network 260-*h* must go through the proxy interface downstream component 302-3 for the sub-network 260-*h*.

Figure 4:
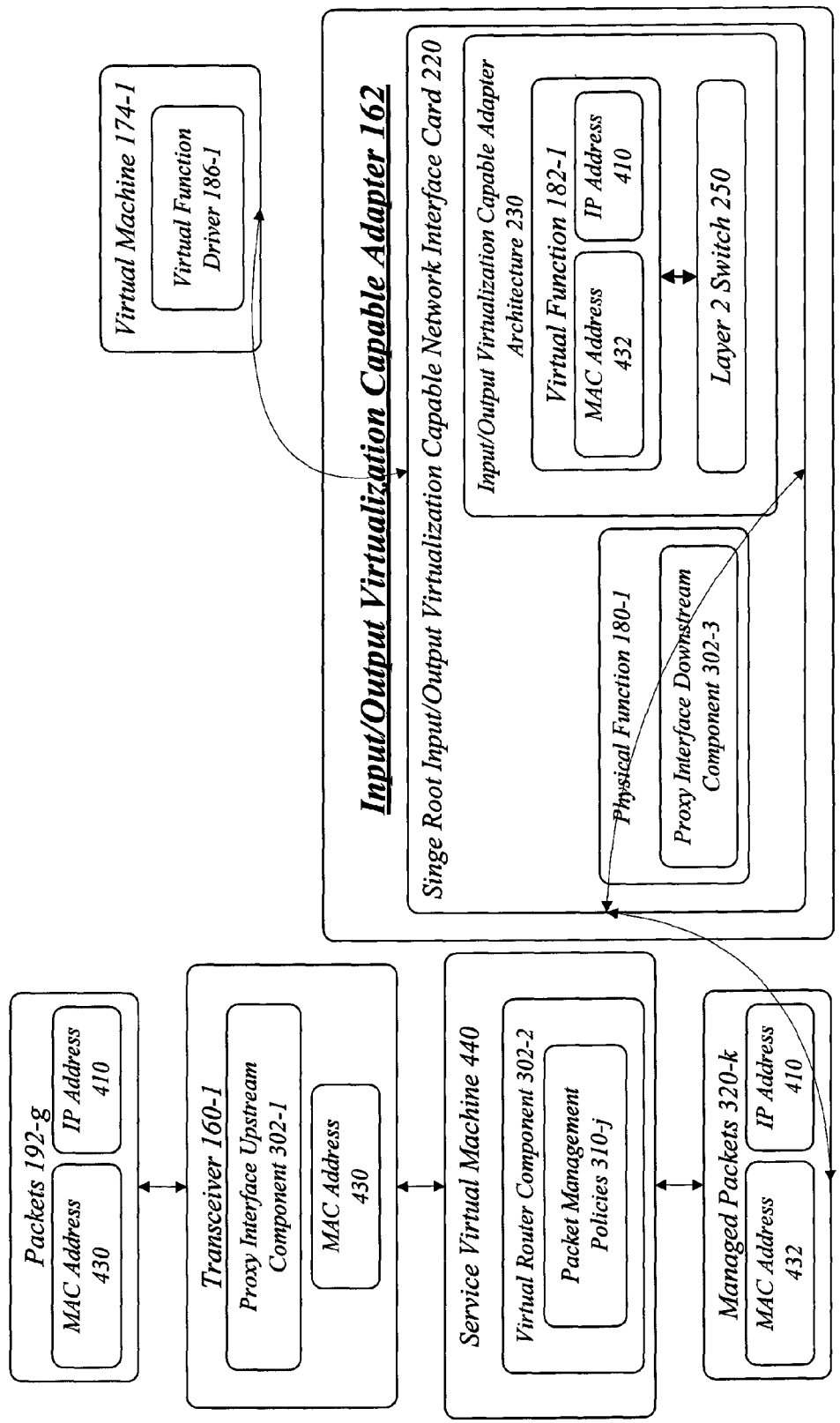
FIG. 4 illustrates an embodiment of a second operating environment for an input/output virtualization packet management system.

FIG. 4 illustrates an embodiment of an operating environment 400 for the input/output virtualization packet management system 100. More particularly, the operating environment 400 may illustrate a more detailed block diagram for the packet management application 140.

As shown in FIG. 4, a packet 192-*g* may be transmitted to the computing device 120 and is received by the proxy interface upstream component 302-1 implemented as a transceiver 160-1, for example, a network interface card. The packet 192-*g* may be associated with a MAC address 430 that corresponds with the MAC address 430 of the transceiver 160-1 implementing the proxy interface upstream component 302-1. The packet 192-*g* is also associated with an IP address 410 of the destination computing device 120 network interface, which, in the example embodiment of FIG. 4, is a virtual function 182-*d* associated with an IP address 410 and a MAC address 432. The proxy interface upstream component 302-1 forwards the packet 192-*g* to the virtual router component 302-2 operating in a service virtual machine 440 within the computing device 120. The virtual router component 302-2 applies packet management policies 310-*j* to the packet 192-*g* and re-addresses the packet 192-*g* so that it is associated with the MAC address 432 of the destination virtual function 182-1, for example, based on registered IP address to MAC address mappings of computing device 120 network interfaces.

The managed packet 320-*k* having IP address 410 and MAC address 432 is forwarded to the proxy interface downstream component 302-3, which is configured to interface with the input/output virtualization capable adapter architecture 230. In FIG. 4, the proxy interface downstream component 302-3 comprises a physical function 180-1 of the input/output virtualization capable adapter 162. The managed packet 320-*k* is forwarded by the proxy interface downstream component 302-3 to the input/output virtualization capable adapter architecture 230, which handles the delivery of the managed packet 320-*k* to the destination virtual function 180-1, and ultimately to the virtual function driver 186-1 of a virtual machine 174-1 operating within the computing device.

As described hereinabove, those having ordinary skill in the art will recognize that that the transmission of outgoing packets 192-*g* being transmitted from the input/output virtualization capable adapter 162 through the packet management application 140 according to embodiments provided herein may operate essentially in a reverse sequence as that associated with the example embodiment of FIG. 4, wherein the MAC address 430 and the IP address 410 of the packet are associated with the external target destination.

Figure 5:
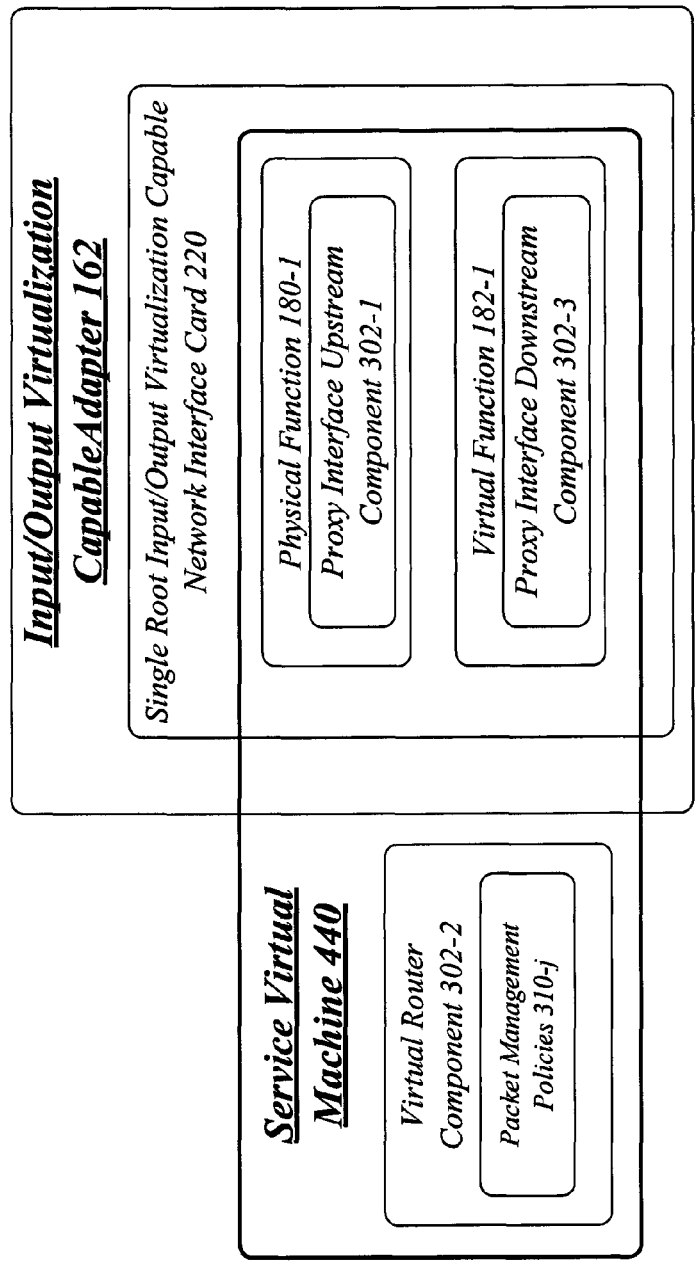
FIG. 5 illustrates an embodiment of a third operating environment for an input/output virtualization packet management system.

FIG. 5 illustrates an embodiment of an operating environment 500 for the input/output virtualization packet management system 100. More particularly, the operating environment 500 may illustrate a more detailed block diagram for the packet management application 140.

As shown in FIG. 5, the proxy interface upstream component 302-1 may be implemented as a physical function 180-1 and the proxy interface downstream component 302-3 may be implemented as a virtual function 182-1 of the input/output virtualization capable adapter 162. However, embodiments are not so limited, as the proxy interface upstream component 302-1 may be implemented as a virtual function 182-*d* or a NIC, and the proxy interface downstream component 302-3 may be implemented as a physical function 180-*c*. As shown in the example embodiment depicted in FIG. 5, the proxy interface upstream component 302-1, virtual router component 302-2, and the proxy interface downstream component 302-3 may operate in the service virtual machine 440 operating within the computing device 120.

Figure 6:
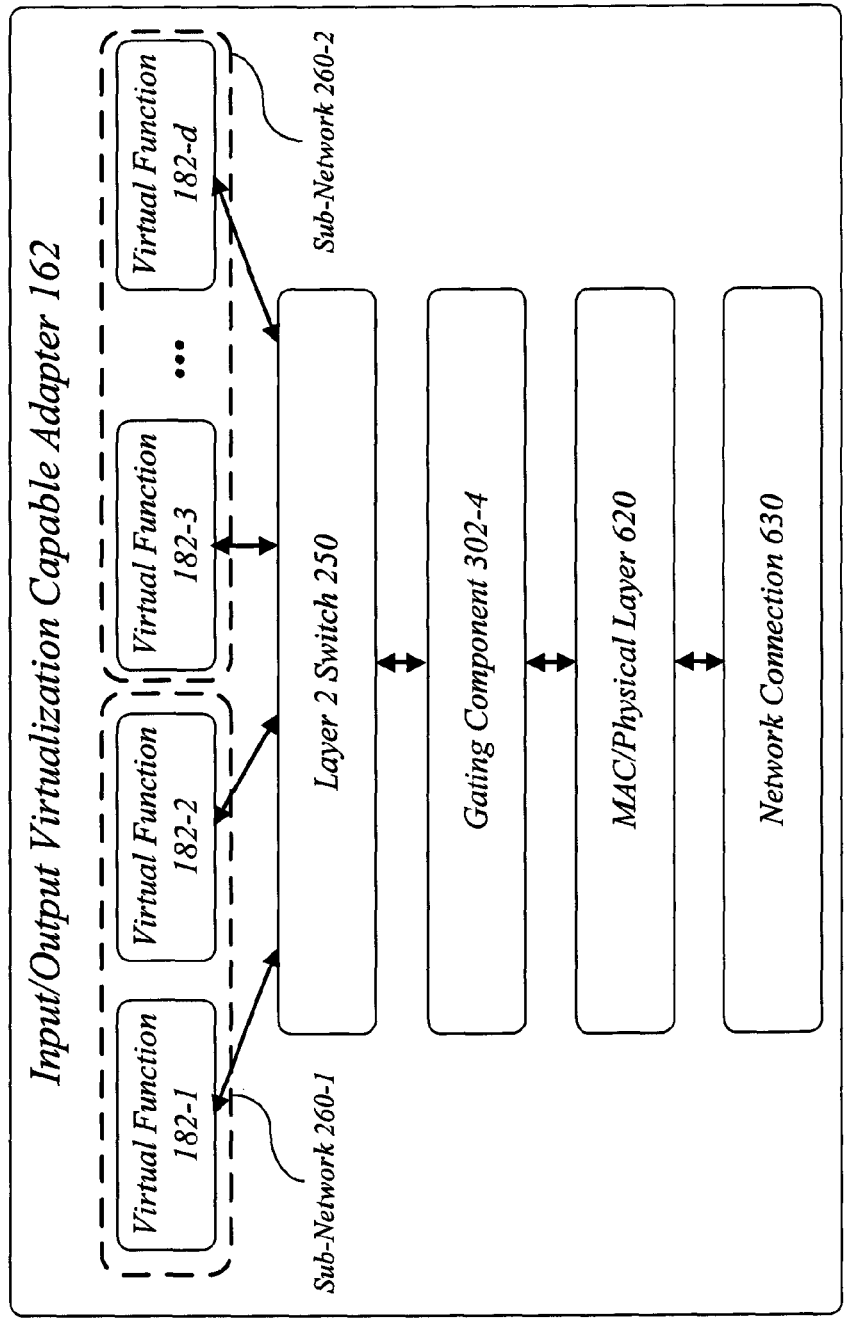
FIG. 6 illustrates an embodiment of a fourth operating environment for an input/output virtualization packet management system.

FIG. 6 illustrates an embodiment of an operating environment 600 for the input/output virtualization packet management system 100. More particularly, the operating environment 600 may illustrate a case where the gating component 302-4 of the packet management application 140 is implemented in an input/output virtualization capable adapter 162.

According to embodiments, the packet management application 140 may be configured to suppress the transmission or receipt of packets 192-*g* from certain virtual functions 182-*d* through a gating component 302-4, which may be configured as a physical function 180-*c* or as a virtual function 182-*d*. In one embodiment, the transmission or receipt of packets 192-*g* may be suppressed for virtual functions 182-*d* operating as an internal network interface for the input/output virtualization capable adapter 162. As such, only the proxy interface upstream component 302-1, for example, implemented as a virtual function 182-*d*, may be able to send packets to an external network 190 or to other virtual functions 182-*d*. In one embodiment, suppression of packet transmission or receipt may operate to enforce a policy to prevent the software router component 302-2 from being bypassed for packets 192-*g* transmitted by computing device 120 network interfaces, such as a virtual machine 174-*b*. In another embodiment, the gating component 302-4 may operate to suppress transmission or receipt of packets 192-*g* being sent between components operating in different sub-networks 260-1, 260-2. For example, the gating component 302-4 may suppress transmission of packets 192-*g* from a virtual function 182-1 within a sub-network 260-1 targeting a virtual function 182-3 within a different sub-network 260-2, wherein the target virtual function 182-3 is not configured as a proxy interface upstream component 302-1.

As shown in FIG. 6, the gating component 302-4 may be inserted between the layer 2 switch 250 and a MAC/physical layer 620 associated with the input/output virtualization capable adapter 162. Computing device 120 network interfaces, such as virtual functions 182-*d*, may attempt to transmit packets 192-*g* to an external network 190 or to other virtual functions 182-*d*. The packets 192-*g* may be transmitted from the virtual functions 182-*d* to the layer 2 switch 250. In one embodiment, the gating component 302-4 may be configured by a physical function 180-1 to selectively gate or bypass a transmission stream from certain virtual functions 182-*d* to suppress the packets from corresponding virtual machines 174-*b*. As such, the gating component 302-4 may operate to prevent packets 192-*g* transmitted from certain computing device 120 network interfaces from reaching the MAC/physical layer 620 and, ultimately, the network connection 630 for transmission to an external network 190, or other computing device 120 network interfaces (e.g., virtual functions 182-*d*) without being routed through the virtual router component 302-3.

Figure 7:
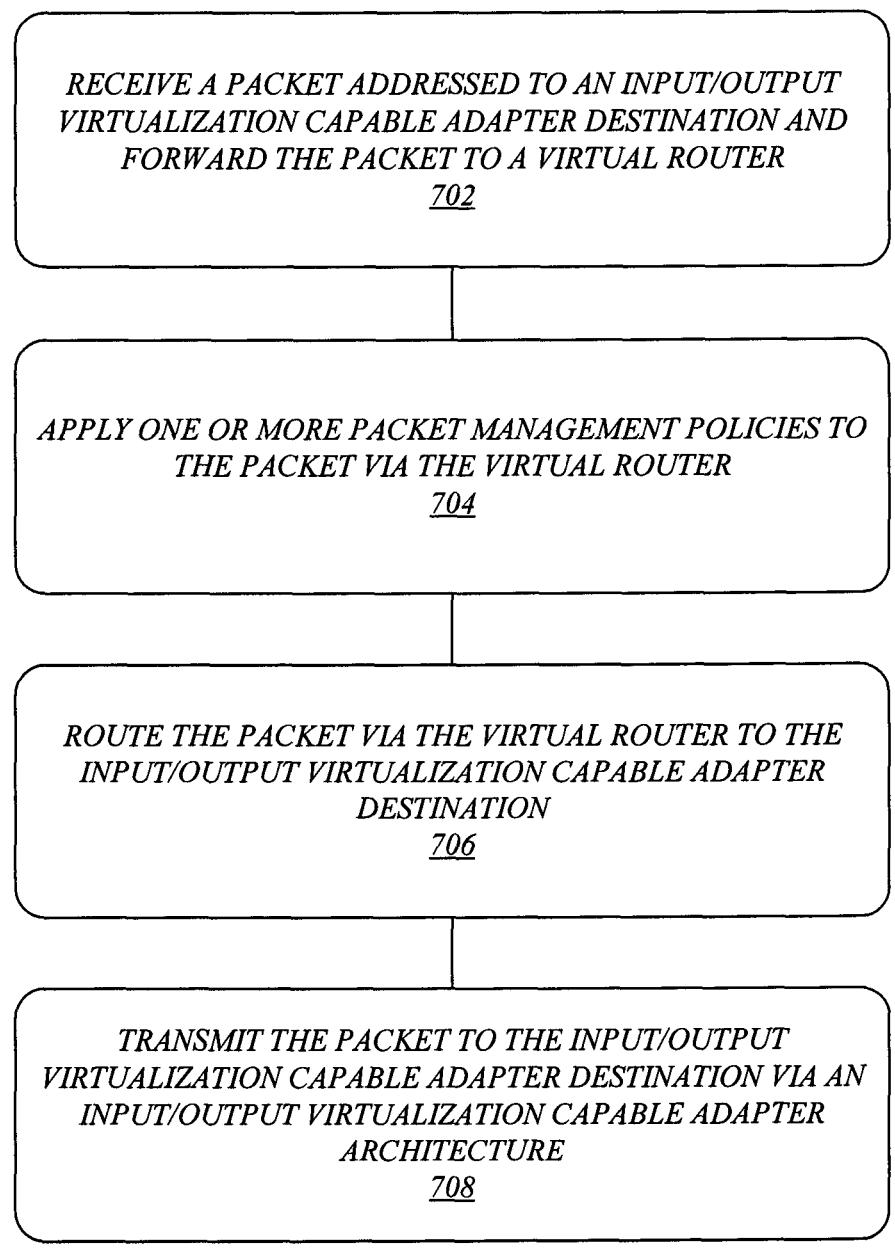
FIG. 7 illustrates an embodiment of a first logic flow for an input/output virtualization packet management system.

FIG. 7 illustrates one embodiment of a logic flow 700. The logic flow 700 may be representative of some or all of the operations executed by one or more embodiments described herein. For example, the logic flow may illustrate operations performed by the input/output virtualization packet management system 100.

In the illustrated embodiment shown in FIG. 7, the logic flow 700 may receive a packet addressed to an input/output virtualization capable adapter destination and forward the packet to a virtual router at block 702. For example, the proxy interface upstream component 302-1 may receive a packet 192-*g* from an external network 190. The packet 192-*g* may be addressed to a virtual function 182-*d* or virtual machine 174-*b* arranged within the computing device 120. The proxy interface upstream component 302-1 may forward the packet 192-*g* to the virtual server component 302-2 for packet management and routing.

The logic flow 700 may apply one or more packet management policies to the packet via the virtual router at block 704. For example, the virtual router component 302-2 may apply one or more packet management policies 310-*j* to the packet 192-*g*. According to embodiments, the one or more packet management policies 310-*j* may be comprised of address (e.g., MAC, IP, TCP port based filtering, or some combination thereof) filtering policies.

The logic flow 700 may route the packet via the virtual router to the input/output virtualization capable adapter destination at block 706. For example, the virtual router component 302-2 may route the packet 192-*g* to a destination indicated by an address contained within the packet 192-*g*. The destination may be a computing device 120 network interface, such as a virtual function 182-*d*. Routing may be comprised of modifying a destination address portion of the packet 192-*g* to contain a destination address (e.g., MAC address of the destination computing device 120 network interface) instead of the address used to transmit the packet (e.g., MAC address associated with the proxy interface upstream component 302-1) to the input/output virtualization capable adapter 162.

The logic flow 700 may transmit the packet to the input/output virtualization capable adapter destination via an input/output virtualization capable adapter architecture at block 708. For example, the proxy interface downstream component 302-3 may receive the packet 192-*g*, now a managed packet 320-*k*, from the virtual router component 302-2 and may forward the managed packet 320-*k* to the input/output virtualization capable adapter architecture 230 for delivery to the ultimate destination. In one embodiment, the proxy interface downstream component 302-3 forwards the packet to a layer 2 switch 250 of the input/output virtualization capable adapter architecture 230.

FIG. 8 illustrates one embodiment of a logic flow 800. The logic flow 800 may be representative of some or all of the operations executed by one or more embodiments described herein. For instance, the logic flow may be representative of the performance of the input/output virtualization packet management system 100.

In the illustrated embodiment shown in FIG. 8, the logic flow 800 may determine a destination address of a packet received at a virtual router at block 802. For example, a packet 192-*g* may be transmitted to the computing device comprising an IP address 410 and a MAC address 430. The IP address 410 may be the IP address associated with an element within the input/output virtualization capable adapter 162, such as a virtual function 182-*d*. The virtual router component 302-2 may utilize the IP address 410 to determine the corresponding MAC address 432 associated with the destination element.

The logic flow 800 may modify the address of the packet to correspond with the address of the destination within the input/output virtualization capable adapter at block 804. For example, the virtual router component 302-2 may change the destination MAC address 430 of the packet 192-*g* from an address associated with the proxy interface upstream component 302-1 to a MAC address 432 associated with the destination within the input/output virtualization capable adapter 162, such as a MAC address 432 associated with a virtual function 182-*d*.

The logic flow 800 may forward the packet to the input/output virtualization capable adapter architecture for transmission to the destination at block 806. For example, the virtual router component 302-2 may forward the packet 192-*g* to the proxy interface downstream component 302-3, which may transmit the packet 192-*g* to the input/output virtualization capable adapter architecture 230. In one embodiment, the proxy interface downstream component 302-3 transmits the packet 192-*g* to a layer 2 switch 250 within the input/output virtualization capable adapter architecture 230. The input/output virtualization capable adapter architecture 230 delivers the packet 192-*g* to the destination (e.g., a virtual function 182-*d*) according to input/output virtualization processes (e.g., single root input/output virtualization processes) known to those having ordinary skill in the art.

FIG. 9 illustrates one embodiment of a logic flow 900. The logic flow 900 may be representative of some or all of the operations executed by one or more embodiments described herein. For instance, the logic flow may be representative of the performance of the input/output virtualization packet management system 100.

In the illustrated embodiment shown in FIG. 9, the logic flow 900 may determine a destination address of a packet received at a virtual router at block 902. For example, the virtual router component 302-2 may receive a packet 192-*g* forwarded by the proxy interface upstream component 302-1. The virtual router component 302-2 may inspect the header of the packet 192-*g* and determine any addresses associated therewith, including IP addresses 410 and MAC addresses 430, 432.

The logic flow 900 may perform a lookup of the addresses associated with the packet in an address registration at block 904. For example, the virtual router component 302-2 may operate to locate one or more destination addresses associated with the packet 192-*g* in an address registration associated, for instance, with the computing device 120, the input/output virtualization capable adapter 162, or both. Based on the packet management policies 310-*j*, the virtual router component may perform a lookup for the associated MAC address 430, 432, IP address 410, or any other associated addresses.

The logic flow 900 may prevent transmission of a packet having an address that is not located in the address registration at block 906. For example, the virtual router component 402-2 may forward a packet 192-*g* associated with an address 410, 430, 432 located in the address registration and may prevent transmission of a packet 192-*g* associated with an address 410, 430, 432 not located in the address registration. In this manner, the packet management application 140 may manage packet transmission within the computing device 120 and the input/output virtualization capable adapter 162, for example, to ensure the security of packets 192-*g* transmitted therein.

Figure 10:
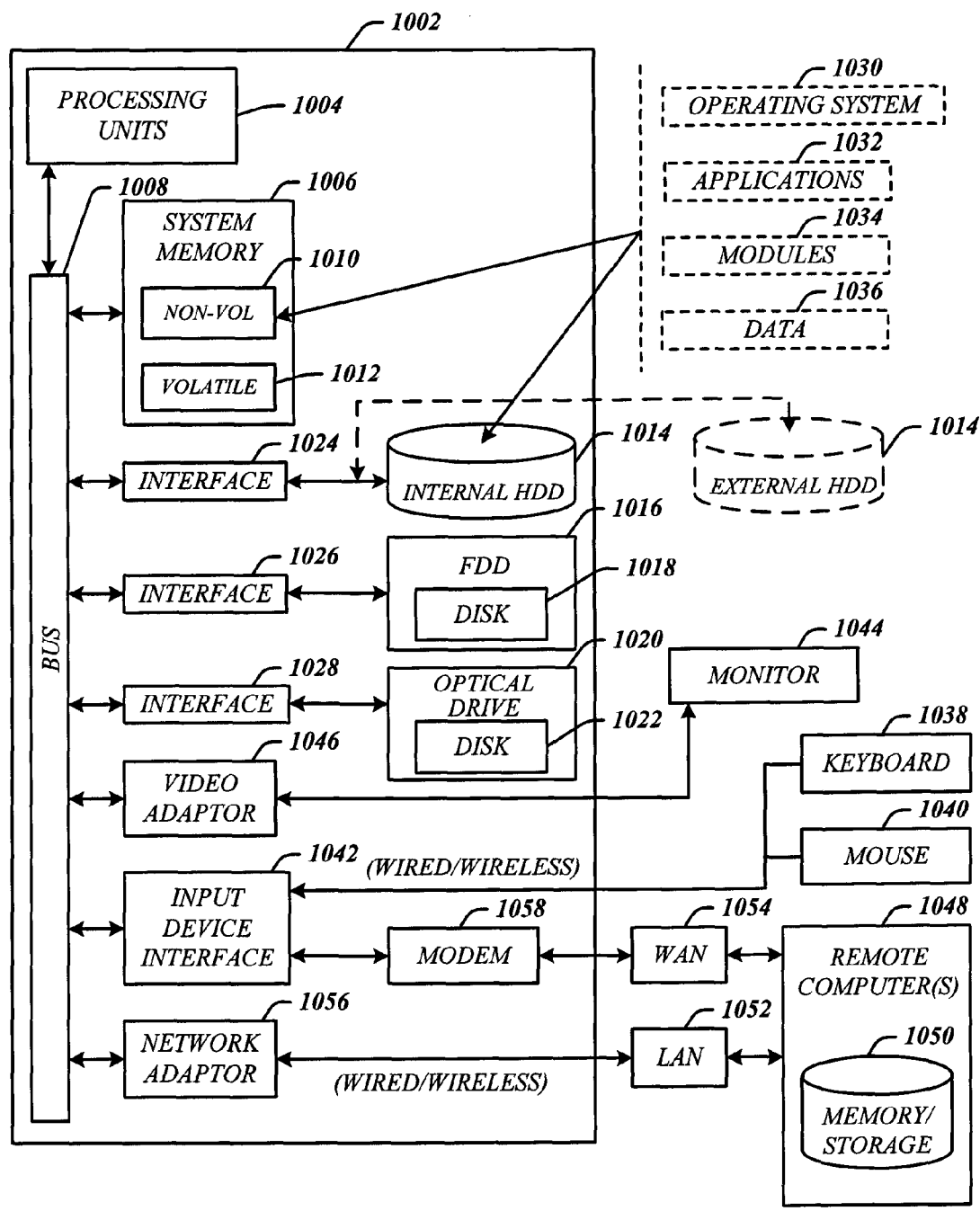
FIG. 10 illustrates an embodiment of a computing architecture suitable for virtualization into multiple virtual machines.

FIG. 10 illustrates an embodiment of an exemplary computing architecture 1000 suitable for implementing various embodiments as previously described, such as an input/output virtualization packet management system 100. In one embodiment, the computing architecture 1000 may comprise or be implemented as part of an electronic device, such as the computing device 120, among others. The embodiments are not limited in this context.

As used in this application, the terms "apparatus" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (input/output) components, power supplies, and so forth. The embodiments, however, are not limited to implementation by the computing architecture 1000.

As shown in FIG. 10, the computing architecture 1000 comprises multiple processing units 1004, a system memory 1006 and a system bus 1008. The processing units 1004 may comprise, for example, the processor circuits 130, 132, the CPU 510, and/or the GPU 530.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express (PCIe), Personal Computer Memory Card International Association (PCM-CIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the input/output virtualization packet management system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The detailed disclosure now turns to providing examples that pertain to further embodiments; examples one through twenty-four (1-24) provided hereinbelow are intended to be exemplary and non-limiting.

In a first example, an apparatus comprises one or more transceivers comprising an input/output virtualization capable adapter; a processor circuit coupled to the one or more transceivers; and a memory unit coupled to the processor circuit. The memory unit may be configured to store a packet management application operative on the processor circuit to apply packet management policies and to route packets transmitted to and from the input/output virtualization capable adapter. The packet management application may comprise a proxy interface upstream component operative to receive and forward a packet addressed to an input/output virtualization capable adapter destination; a virtual router component operative to receive the packet as forwarded by the proxy interface upstream component, the virtual router component to apply one or more packet management policies to the packet and to route the packet to the input/output virtualization capable adapter destination; and a proxy interface downstream component operative to receive the packet as routed by the virtual router and to transmit the packet to the input/output virtualization capable adapter destination via an input/output virtualization capable adapter architecture.

A second example comprises the apparatus described in the first example, further comprising an input/output virtualization capable adapter comprising a single root input/output virtualization capable network interface card.

A third example comprises the apparatus described in the first or second examples, wherein the proxy interface upstream component comprises a network interface card.

A fourth example comprises any of the apparatus described in the first or second examples, wherein the proxy interface upstream component comprises a virtual function of the input/output virtualization capable adapter.

A fifth example comprises any of the apparatus described in the first through fourth examples, wherein the proxy interface downstream component comprises a physical function of the input/output virtualization adapter.

A sixth example comprises any of the apparatus described in the first through fifth examples, wherein the virtual router component is operative to apply one or more packet management policies comprising one or more address filtering policies, the one or more address filtering policies configured to lookup one or more addresses associated with the packet in an address registration associated with the input/output virtualization capable adapter; and prevent transmission of a packet associated with an address not located in the address registration.

A seventh example comprises any of the apparatus described in the first through sixth examples, wherein the virtual router component is operative to route the packet via modifying a destination address of the packet from an external destination address associated with the proxy interface upstream component to an internal destination address associated with the input/output virtualization capable adapter destination.

An eighth example comprises any of the apparatus described in the first through seventh examples, wherein the proxy interface downstream component is operative to transmit the packet to a layer 2 switch of the input/output virtualization capable adapter architecture.

A ninth example comprises any of the apparatus described in the first through eighth examples, the proxy interface downstream component operative to receive a packet from the input/output virtualization capable adapter architecture and to forward the packet to the virtual router component; wherein the virtual router component is operative to apply one or more packet management policies to the packet, modify a destination address of the packet to an external destination address, and to forward the packet to the proxy interface upstream component; wherein the proxy interface upstream component is operative to transmit the packet to an external network.

A tenth example comprises any of the apparatus described in the first through ninth examples, the packet management apparatus comprising a gating component operative to suppress transmission of packets from an input/output virtualization capable adapter source to an external network, the packets being configured to bypass the virtual router component.

An eleventh example comprises any of the apparatus described in the first through tenth examples, the input/output virtualization capable adapter comprising a plurality of virtual functions arranged in one or more sub-networks, the one or more sub-networks comprising one or more proxy interface downstream components configured to receive packets transmitted between the plurality of virtual functions.

In a twelfth example, a method comprises receiving, at one or more transceivers comprising an input/output capable adapter and accessible by a computing device, a packet addressed to an input/output virtualization capable adapter destination, and forwarding the packet to a virtual router; applying, by a processor circuit coupled to the one or more transceivers, one or more packet management policies to the packet via the virtual router; routing the packet via the virtual router to the input/output virtualization capable adapter destination; and transmitting the packet to the input/output virtualization capable adapter destination via an input/output virtualization capable adapter architecture.

A thirteenth example comprises the method described in the twelfth example, wherein the input/output virtualization capable adapter comprises a single root input/output virtualization capable network interface card.

A fourteenth example comprises the method described in the twelfth or thirteenth examples, further comprising receiving the packet addressed to the input/output virtualization capable adapter destination via a network interface card.

A fifteenth example comprises the method described in the twelfth or thirteenth examples, further comprising receiving the packet addressed to the input/output virtualization capable adapter destination via a virtual function of the input/output virtualization capable adapter.

A sixteenth example comprises the method described in any of the twelfth through fifteenth examples, further comprising transmitting the packet to the input/output virtualization capable adapter destination via the input/output virtualization capable adapter architecture utilizing a physical function of the input/output virtualization capable adapter.

A seventeenth example comprises the method described in any of the twelfth through sixteenth examples, further comprising applying one or more packet management policies comprising one or more address filtering policies, the one or more address filtering policies configured to lookup one or more addresses associated with the packet in an address registration associated with the input/output virtualization capable adapter; and preventing transmission of a packet associated with an address not located in the address registration.

An eighteenth example comprises the method described in any of the twelfth through seventeenth examples, further comprising routing the packet via modifying a destination address of the packet from an external destination address associated with the input/output virtualization capable adapter to an internal destination address associated with the input/output virtualization capable adapter destination.

A nineteenth example comprises the method described in any of the twelfth through eighteenth examples, further comprising transmitting the packet to the input/output virtualization capable adapter destination via transmitting the packet to a layer 2 switch of the input/output virtualization capable adapter architecture.

A twentieth example comprises the method described in any of the twelfth through nineteenth examples, further comprising receiving a packet from the input/output virtualization capable adapter architecture, and forwarding the packet to the virtual router; wherein the virtual router is configured to apply one or more packet management policies to the packet, modify a destination address of the packet to an external destination address, and forward the packet for transmission to an external network.

A twenty-first example comprises the method described in any of the twelfth through twentieth examples, further comprising suppressing transmission of packets from an input/output virtualization capable adapter source to an external network, the packets being configured to bypass the virtual router.

A twenty-second example comprises the method described in any of the twelfth through twenty-first examples, comprising arranging a plurality of virtual functions of the input/output virtualization capable adapter in one or more sub-networks, the one or more sub-networks comprising one or more proxy interface downstream components configured to receive packets transmitted between the plurality of virtual functions.

In a twenty-third example, at least one machine-readable storage medium comprises a plurality of instructions that in response to being executed on a computing device, cause the computing device to carry out any method described in the twelfth through twenty-second examples.

In a twenty-fourth example, an apparatus comprises a means for performing any method described in the twelfth through twenty-second examples.

Elements of the various embodiments may be implemented as various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
one or more transceivers comprising an input/output virtualization capable adapter;
a processor circuit coupled to the one or more transceivers; and
a memory unit coupled to the processor circuit, the memory unit to store a packet management application operative on the processor circuit to apply packet management policies and to route packets transmitted to and from the input/output virtualization capable adapter, the packet management application comprising:
 a proxy interface upstream component operative to receive and forward a packet addressed to an input/output virtualization capable adapter destination;
 a virtual router component operative to receive the packet as forwarded by the proxy interface upstream component, the virtual router component to apply one or more packet management policies to the packet and to route the packet to the input/output virtualization capable adapter destination; and
 a proxy interface downstream component operative to receive the packet as routed by the virtual router and to transmit the packet to the input/output virtualization capable adapter destination via a layer 2 switch of an input/output virtualization capable adapter architecture.

2. The apparatus of claim 1, the input/output virtualization capable adapter comprising a single root input/output virtualization capable network interface card.

3. The apparatus of claim 1, the proxy interface upstream component comprising a network interface card.

4. The apparatus of claim 1, the proxy interface upstream component comprising a virtual function of the input/output virtualization capable adapter.

5. The apparatus of claim 1, the virtual router component operative to:
apply one or more packet management policies comprising one or more address filtering policies, the one or more address filtering policies configured to lookup one or more addresses associated with the packet in an address registration associated with the input/output virtualization capable adapter; and
prevent transmission of a packet associated with an address not located in the address registration.

6. The apparatus of claim 1, the virtual router component operative to route the packet via modifying a destination address of the packet from an external destination address associated with the proxy interface upstream component to an internal destination address associated with the input/output virtualization capable adapter destination.

7. The apparatus of claim 1, the proxy interface downstream component operative to receive a packet from the input/output virtualization capable adapter architecture and to forward the packet to the virtual router component; wherein the virtual router component is operative to apply one or more packet management policies to the packet, modify a destination address of the packet to an external destination address associated with an external destination, and to forward the packet to the proxy interface upstream component; wherein the proxy interface upstream component is operative to transmit the packet to an external network.

8. The apparatus of claim 1, the packet management apparatus comprising a gating component operative to suppress transmission of packets from an input/output virtualization capable adapter source to an external network, the packets being configured to bypass the virtual router component.

9. The apparatus of claim 1, the input/output virtualization capable adapter comprising a plurality of virtual functions arranged in one or more sub-networks, the one or more sub-networks comprising one or more proxy interface downstream components configured to receive packets transmitted between the plurality of virtual functions.

10. A method, comprising:
receiving, at one or more transceivers comprising an input/output capable adapter and accessible by a computing device, a packet addressed to an input/output virtualization capable adapter destination, and forwarding the packet to a virtual router;

applying, by a processor circuit coupled to the one or more transceivers, one or more packet management policies to the packet via the virtual router;
routing the packet via the virtual router to the input/output virtualization capable adapter destination; and
transmitting the packet to the input/output virtualization capable adapter destination via a layer 2 switch of an input/output virtualization capable adapter architecture.

11. The method of claim 10, the input/output virtualization capable adapter comprising a single root input/output virtualization capable network interface card.

12. The method of claim 10, comprising receiving the packet addressed to the input/output virtualization capable adapter destination via a network interface card.

13. The method of claim 10, comprising receiving the packet addressed to the input/output virtualization capable adapter destination via a virtual function of the input/output virtualization capable adapter.

14. The method of claim 10, comprising transmitting the packet to the input/output virtualization capable adapter destination via the input/output virtualization capable adapter architecture utilizing a physical function of the input/output virtualization capable adapter.

15. The method of claim 10, comprising:
applying one or more packet management policies comprising one or more address filtering policies, the one or more address filtering policies configured to lookup one or more addresses associated with the packet in an address registration associated with the input/output virtualization capable adapter; and
preventing transmission of a packet associated with an address not located in the address registration.

16. The method of claim 10, comprising routing the packet via modifying a destination address of the packet from an external destination address associated with the input/output virtualization capable adapter to an internal destination address associated with the input/output virtualization capable adapter destination.

17. The method of claim 10, comprising receiving a packet from the input/output virtualization capable adapter architecture, and forwarding the packet to the virtual router; wherein the virtual router is configured to apply one or more packet management policies to the packet, modify a destination address of the packet to an external destination address associated with an external destination, and forward the packet for transmission to an external network.

18. The method of claim 10, comprising suppressing transmission of packets from an input/output virtualization capable adapter source to an external network, the packets being configured to bypass the virtual router.

19. The method of claim 10, comprising arranging a plurality of virtual functions of the input/output virtualization capable adapter in one or more sub-networks, the one or more sub-networks comprising one or more proxy interface downstream components configured to receive packets transmitted between the plurality of virtual functions.

20. At least one non-transitory computer-readable medium comprising a plurality of instructions that in response to being executed on a computing device, cause the computing device to:
receive, at one or more transceivers comprising an input/output capable adapter and accessible by a computing device, a packet addressed to an input/output virtualization capable adapter destination, and forwarding the packet to a virtual t;

apply, by a processor circuit coupled to the one or more transceivers, one or more packet management policies to the packet via the virtual router;
route the packet via the virtual router to the input/output virtualization capable adapter destination; and
transmit the packet to the input/output virtualization capable adapter destination via a layer 2 switch of an input/output virtualization capable adapter architecture.

21. The at least one non-transitory computer-readable storage medium of claim 20, comprising instructions that when executed cause the computing device to receive a packet at a single root input/output virtualization capable network interface card.

22. The at least one non-transitory computer-readable storage medium of claim 20, comprising instructions that when executed cause the computing device to receive the packet addressed to the input/output virtualization capable adapter destination via a network interface card.

23. The at least one non-transitory computer-readable storage medium of claim 20, comprising instructions that when executed cause the computing device to receive the packet addressed to the input/output virtualization capable adapter destination via a virtual function of the input/output virtualization capable adapter.

24. The at least one non-transitory computer-readable storage medium of claim 20, comprising instructions that when executed cause the computing device to:
apply one or more packet management policies comprising one or more address filtering policies, the one or more address filtering policies configured to lookup one or more addresses associated with the packet in an address registration associated with the input/output virtualization capable adapter; and
prevent transmission of a packet associated with an address not located in the address registration.

25. The at least one non-transitory computer-readable storage medium of claim 20, comprising instructions that when executed cause the computing device to route the packet via modifying a destination address of the packet from an external destination address associated with the input/output virtualization capable adapter to an internal destination address associated with the input/output virtualization capable adapter destination.

26. The at least one non-transitory computer-readable storage medium of claim 20, comprising instructions that when executed cause the computing device to receive a packet from the input/output virtualization capable adapter architecture, and forwarding the packet to the virtual router; wherein the virtual router is configured to apply one or more packet management policies to the packet, modify a destination address of the packet to an external destination address associated with an external destination, and forward the packet for transmission to an external network.

27. The at least one non-transitory computer-readable storage medium of claim 20, comprising instructions that when executed cause the computing device to suppress transmission of packets from an input/output virtualization capable adapter source to an external network, the packets being configured to bypass the virtual router.

28. The at least one non-transitory computer-readable storage medium of claim 20, comprising instructions that when executed cause the computing device to arrange a plurality of virtual functions of the input/output virtualization capable adapter in one or more sub-networks, the one or more sub-networks comprising one or more proxy interface downstream components configured to receive packets transmitted between the plurality of virtual functions.

* * * * *